(12) United States Patent
Kosaka

(10) Patent No.: US 6,673,888 B2
(45) Date of Patent: Jan. 6, 2004

(54) OPTICAL MATERIALS HAVING GOOD ULTRAVIOLET ABSORBABILITY AND METHOD FOR PRODUCING THEM

(75) Inventor: Masahisa Kosaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/072,871

(22) Filed: Feb. 12, 2002

(65) Prior Publication Data

US 2002/0132954 A1 Sep. 19, 2002

Related U.S. Application Data

(63) Continuation of application No. 09/666,415, filed on Sep. 20, 2000, now Pat. No. 6,441,119.

(30) Foreign Application Priority Data

Sep. 20, 1999 (JP) .......................................... H11-265297

(51) Int. Cl.⁷ ............................................... C08G 18/30
(52) U.S. Cl. ......................... 528/49; 524/720; 523/106; 528/73; 351/159; 351/177
(58) Field of Search ................................. 351/159, 177; 528/49, 73; 524/720; 523/106

(56) References Cited

U.S. PATENT DOCUMENTS

| | | |
|---|---|---|
| 4,304,895 A | 12/1981 | Loshaek |
| 4,390,676 A | 6/1983 | Loshaek |
| 4,528,311 A | 7/1985 | Beard et al. |
| 4,636,212 A | 1/1987 | Posin et al. |
| 4,719,248 A | 1/1988 | Bambury et al. |
| 4,872,877 A | 10/1989 | Tiffany |
| 5,080,688 A | 1/1992 | Cohen |
| 5,098,445 A | 3/1992 | Hung et al. |
| 6,201,061 B1 | 3/2001 | Amagai et al. |
| 6,218,463 B1 | 4/2001 | Molock et al. |

OTHER PUBLICATIONS

Japanese Patent Abstract, 62254119 A, Apr., 1999.
Japanese Patent Abstract, 09265059 A; Oct., 1997.
Japanese Patent Abstract, 01230003 A; Sep., 1989.
Japanese Patent Abstract, 02093422 A; Apr., 1990.
Japanese Patent Abstract, 02171716 A; Jul., 1990.
Japanese Patent Abstract, 58122501 A; Jul., 1983.
Wang: Synthesis and properties of benzotriazoles as UV absorbers; Jrnl. of East China University of Science and Technology; 25(2); pp. 167–169, 173; Apr., 1999.

*Primary Examiner*—Rachel Gorr
(74) *Attorney, Agent, or Firm*—Morrison & Foerster LLP

(57) ABSTRACT

An optical material, particularly a plastic lens for spectacles, which absorbs almost all UV rays of up to around 400 nm or so and is not too yellow in color, is obtained by adding 2-(2-hydroxy-4-octyloxyphenyl)-benzotriazole to a diethylene glycol bisallylcarbonate monomer, a (thio)urethane monomer or an episulfide monomer, mixing them, and polymerizing the monomer.

15 Claims, 6 Drawing Sheets

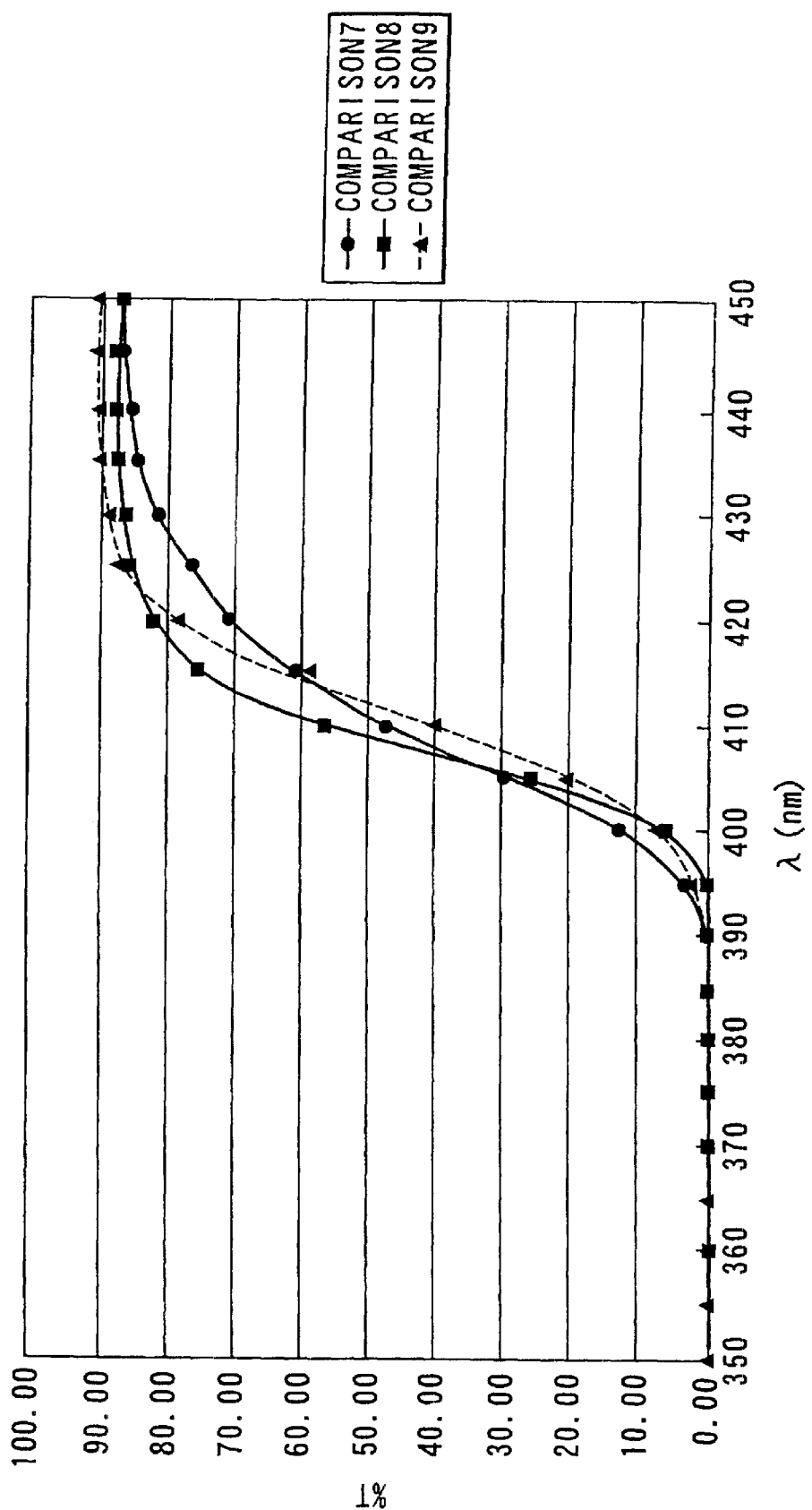

OPTICAL MATERIALS HAVING GOOD ULTRAVIOLET ABSORBABILITY AND METHOD FOR PRODUCING THEM

RELATED APPLICATIONS

This application is a continuation of Ser. No. 09/666,415, filed Sep. 20, 2000, now U.S. Pat. No. 6,441,119. This application claims priority from Japanese Application No. 11-265297, filed Sep. 20, 1999, the entire disclosure of which is hereby incorporated herein by reference. This application discloses subject matter related to subject matter disclosed in co-pending U.S. patent application: Ser. No. 09/666,414, filed Sep. 20, 2000, now U.S. Pat. No. 6,448,304, which claims priority from Japanese Application No. 11-265321, tiled Sep. 20, 1999, the entire disclosures of which are hereby incorporated herein by reference. The disclosures of patents, applications and publications referred in this application are also incorporated herein by reference.

TECHNICAL FIELD OF THE INVENTION

The present invention relates to plastic lenses of good UV absorbability for spectacles, and to a method for producing them. More precisely, the invention relates to plastic lenses for spectacles, which absorb long-wave UV rays having a wavelength of around 400 nm or so and are not too much yellowish, and relates to a method for producing them.

BACKGROUND OF THE INVENTION

UV rays are electromagnetic radiation having a wavelength of from around 200 to 400 nm or so, and are said to have some negative influences on human bodies. In the field of lenses for spectacles, there is increasing a demand for UV-absorbing lenses for protecting human eyes from UV rays.

Various methods are known for producing UV-absorbing plastic lenses for spectacles. The first method comprises incorporating a UV absorbent such as 2,2'-dihydroxy-4-methoxybenzophenone, 2,2'-dihydroxy-4-n-octoxybenzophenone or the like to a plastic lens monomer followed by polymerizing the monomer to give plastic lenses, as in Japanese Patent Laid-Open Nos. 50049/1975, 122501/1983, 171716/1990, 93422/1990 and 254119/1987.

The second method is for coloring plastic lenses, comprising dipping plastic lenses in an aqueous solution with a UV absorbent dispersed therein, under heat at 80 to 100° C., thereby to infiltrate the UV absorbent into the plastic lenses (Japanese Patent Laid-Open No. 230003/1989).

The third method comprises applying a substance capable of absorbing and/or scattering UV rays onto plastic lenses (Japanese Patent Laid-Open No. 265059/1997).

Of those methods, it is presumed that the majority of conventional commercially-available plastic lenses for spectacles capable of absorbing UV rays of up to 400 nm will be produced according to the second method.

The first method disclosed in Japanese Patent Laid-Open Nos. 171716/1990, 93422/1990 and 254119/1987 is for improving the lightfastness of plastic lenses. In case where lenses capable of absorbing UV rays of up to around 400 nm or so are produced according to the first method in which are used conventional UV absorbents (2,2'-dihydroxy-4-methoxybenzophenone, 2,2'-dihydroxy-4-n-octoxybenzophenone, etc.), and especially where diethylene glycol bisallylcarbonate which is one typical material for plastic lenses for spectacles is used for producing such UV-absorbing lenses, some problems are inevitable. One problem is that the plastic lenses produced are often extremely yellowish and their appearances are therefore poor; and another is that a large amount of the UV absorbent is used, therefore having some negative influences on the polymerization reaction, and the physical properties of the plastic lenses produced are often poor.

The second method for producing plastic lenses capable of absorbing UV rays of up to around 400 nm or so is also problematic in that the UV absorbent to be used therein must have a high degree of UV absorbability and have a suitable degree of solubility in water, and that the plastic lenses produced therein could not have a satisfactory degree of UV absorbability, or even if they could have it, the dipping time for them shall be prolonged. In place of using water as in the second method, another method of using an organic solvent has been proposed. However, this is still problematic in that the plastic lenses produced therein and capable of absorbing UV rays of up to around 400 nm or so are often extremely yellowish.

The third method is also not suitable for obtaining plastic lenses capable of absorbing UV rays of up to around 400 nm or so.

Due to the deficiencies of the known methods, there exist a need for obtaining plastic lenses that are not too yellow in color and yet would be capable of absorbing UV rays of up to around 400 nm.

BRIEF DESCRIPTION OF THE DRAWINGS

FIG. 6 is a graph showing the spectral curves through the lenses of Comparative Examples 7 to 9.

SUMMARY OF THE INVENTION

Figure 1:
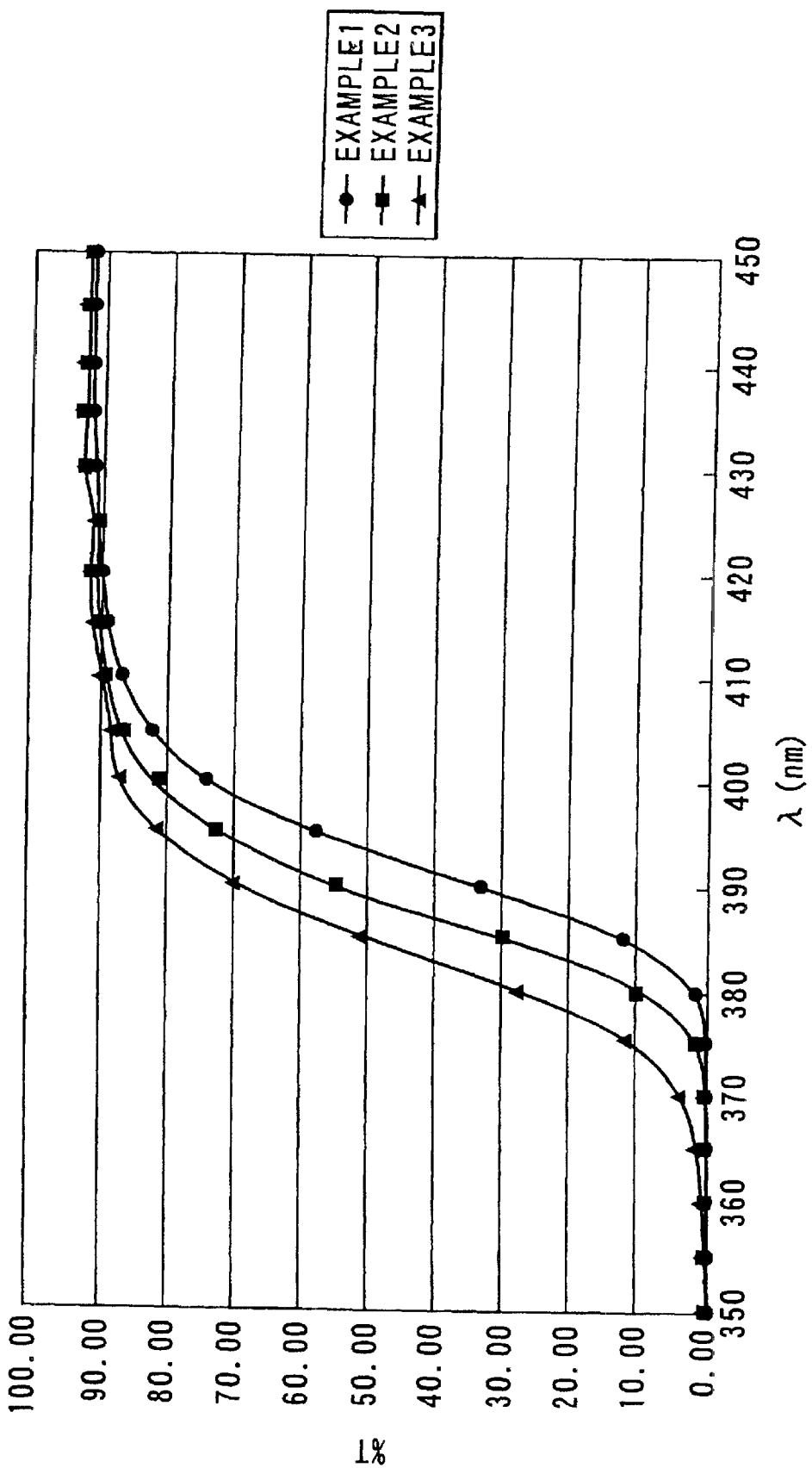
FIG. 1 is a graph showing the spectral curves through the lenses of Examples 1 to 3.

The present invention solves the problems noted above and provides a method a method for producing plastic lenses for spectacles, in which the plastic lenses produced have an improved ability to absorb UV rays of up to around 400 nm or so but are not so much yellowish like conventional plastic lenses for spectacles, and in which the amount of the UV absorbent to be added to the lenses is reduced.

Applicants have unexpectedly found that when a specific plastic lens monomer combined with a specific UV absorbent is used for producing lenses for spectacles, then the lenses produced can have an excellent ability to absorb UV rays of up to around 400 nm or so and are not unacceptably yellowish in color. On the basis of this finding, applicants have completed the present invention.

Specifically, the invention provides a method for producing plastic lenses of good UV absorbability for spectacles, which comprises adding 2-(2-hydroxy-4-octyloxyphenyl)-benzotriazole to a diethylene glycol bisallylcarbonate monomer, a (thio)urethane monomer or a episulfide monomer, mixing them, and polymerizing the monomer.

An embodiment of this invention is a method for producing an optical material comprising, adding 2-(2-hydroxy-4- octyloxyphenyl)-benzotriazole to a monomer selected from the group consisting of a diethylene glycol bisallylcarbonate monomer, a (thio)urethane monomer and a episulfide monomer, mixing the 2-(2-hydroxy-4-octyloxyphenyl)-benzotriazole and the monomer to form a mixture, and polymerizing the monomer. The method could further comprise casting the mixture into a mold for a lens before polymerizing the monomer.

Another embodiment of this invention is an optical material comprising 2-(2-hydroxy-4-octyloxyphenyl)-benzotriazole and a polymer formed by polymerizing a monomer selected from the group consisting of a diethylene glycol bisallylcarbonate monomer, a (thio)urethane monomer and a episulfide monomer. The optical material could be capable of absorbing long-wave UV rays having a wavelength of around 400 nm. In one embodiment, the optical material is a plastic lens for spectacles.

In a preferred embodiment, the monomer is a diethylene glycol bisallylcarbonate monomer and the optical material has a yellowness index (YI) falling between about 0.7 and 1.6 and a 380 nm UV transmittance of at most 30% when a thickness of the optical material is of about 2.2 mm.

In another preferred embodiment, the monomer is a (thio)urethane monomer and the optical material has a yellowness index (YI) falling between about 0.7 and 1.5 and a 400 nm UV transmittance of at most 35% when a thickness of the optical material is of about 1.6 mm.

In yet another preferred embodiment, the monomer is an episulfide monomer and the optical material has a yellowness index (YI) falling between about 0.7 and 1.8 and a 400 nm UV transmittance of at most 30% when a thickness of the optical material is of about 1.8 mm.

DETAILED DESCRIPTION OF THE INVENTION

The UV absorbent to be used in the invention is 2-(2-hydroxy-4-octyloxyphenyl)-benzotriazole. This 2-(2-hydroxy-4-octyloxyphenyl)-benzotriazole is registered in the Chemical Abstract Registry as Number 3147-77-1, and is a known substance. However, no one knows that 2-(2-hydroxy-4-octyloxyphenyl)-benzotriazole is usable as a UV absorbent for plastic lenses, and that, when a plastic lens monomer is mixed with it and polymerized, then it gives plastic lenses which can absorb UV rays of up to around 400 nm or so and are not so much yellowish like conventional plastic lenses. In addition, no one also knows that the advantages of the plastic lenses thus containing the compound could be attained by adding only a small amount of the compound 2-(2-hydroxy-4-octyloxyphenyl)-benzotriazole to the lenses.

The amount of 2-(2-hydroxy-4-octyloxyphenyl)-benzotriazole to be added to the plastic lenses of the invention varies, depending on the type of the monomer used for producing the lenses and on the intended UV-absorbing characteristics of the lenses, but preferably falls between 0.01 and 10% by weight of the plastic lens monomer, more preferably between 0.01 and 5% by weight thereof.

The plastic lens monomer for use in the invention includes (thio)urethane monomers, episulfide monomers, and diethylene glycol bisallylcarbonate monomers.

(Thio)urethane monomers are starting monomers for producing thiourethane or urethane lenses, concretely including a combination of a polyisocyanate compound and a polythiol compound, and a combination of a polyisocyanate compound and a polyol compound.

The polyisocyanate compound is not specifically defined, including, for example, alicyclic isocyanate compounds such as hydrogenated 2,6-tolylene diisocyanate, hydrogenated meta- and para-phenylene diisocyanates, hydrogenated 2,4-tolylene diisocyanate, hydrogenated diphenylmethane diisocyanate, hydrogenated metaxylylene diisocyanate, hydrogenated paraxylylene diisocyanate, isophorone diisocyanate, etc.; isocyanate compounds, such as meta- and para-phenylene diisocyanates, 2,6-tolylene diisocyanate, 2,4-tolylene diisocyanate, 4,4'-diphenylmethane diisocyanate, meta- and para-xylylene diisocyanates, meta- and para-tetramethylxylylene diisocyanates, 2,6-naphthalene diisocyanate, 1,5-naphthalene diisocyanate, hexamethylene diisocyanate, octamethylene diisocyanate, 2,2,4-trimethylhexamethylene diisocyanate, tetramethylene diisocyanate, biuret reaction products of hexamethylene diisocyanate, trimers of hexamethylene diisocyanate, lysine diisocyanate, lysine triisocyanate, 1,6,11-undecane triisocyanate, triphenylmethane triisocyanate, etc.; sulfur-containing isocyanate compounds such as diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate, 4,4'-dimethoxydiphenyldisulfide-3,3'-diisocyanate, diphenylsulfone-4,4'-diisocyanate, diphenylsulfone-3,3'-diisocyanate, benzylidenesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatobenzylsulfone, 4,4'-dimethyldiphenylsulfone-3,3'-diisocyanate, 4,4'-di-tert-butyldiphenylsulfone-3,3'-diisocyanate, 4,4'-dimethoxybenzene-ethylenedisulfone-3,3'-diisocyanate, 4,4'-dichlorodiphenylsulfone-3,3'-diisocyanate, 4-methyl-3-isocyanatobenzenesulfonyl-4'-isocyanatophenol ester, 4-methoxy-3-isocyanatobenzenesulfonyl-4'-isocyanatophenol ester, 4-methyl-3-isocyanatobenzenesulfonylanilido-3'-methyl-4'-isocyanate, dibenzenesulfonyl-ethlenediamine-4,4'-diisocyanate, 4,4'-dimethoxybenzenesulfonyl-ethylenediamine-3,3'-diisocyanate, 4-methyl-3-isocyanatobenzenesulfonylanilido-4-methyl-3'-isocyanate, thiophene-2,5-diisocyanate, thiophene-2,5-diisocyanatomethyl, 1,4-dithian-2,-diisocyanate, 1,4-dithian-2,5-diisocyanatomethyl, 1,4-dithian-2,3-diisocyanatomethyl, 1,4-dithian-2-isocyanatomethyl-5-isocyanatopropyl, 1,3-dithiolan-4,5-diisocyanate, 1,3-dithiolan-4,5-diisocyanatomethyl, 1,3-dithiolan-2-methyl-4,5-diisocyanatomethyl, 1,3-dithiolan-2,2-diisocyanatoethyl, tetrahydrothiophene-2,5-diisocyanate, tetrahydrothiophene-2,5-diisocyanatomethyl, tetrahydrothiophene-2,5-diisocyanatoethyl, tetrahydrothiophene-3,4-diisocyanatomethyl, etc.

The polythiol compound includes aliphatic thiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis (mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, bis(2-mercaptoethyl) thiomalate, 2-mercaptoethyl 2,3-dimercaptosuccinate, 2,3-dimercapto-1-propanol 2-mercaptoacetate, 2,3-dimercapto-1-propanol 3-mercaptoacetate, diethylene glycol bis(2-mercaptoacetate), diethylene glycol bis(3- mercaptopropionate), 1,2-dimercaptopropylmethyl ether, 2,3-dimercaptopropylmethyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-bis(2-mercaptoethylthio)-3-mercaptopropane, etc.; aromatic thiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(trimercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, etc.; halogen (e.g., chlorine or bromine)-substituted aromatic thiols such as 2,5-dichlorobenzene-1,3-dithiol, 1,3-di(p-chlorophenyl)propane-2,2-dithiol, 3,4,5-tribromo-1,2-dimercaptobenzene, 2,3,4,6-tetrachloro-1,5-bis(mercaptomethyl)benzene, etc.; aromatic thiols having sulfur atom(s) in addition to mercapto groups, such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, etc., and their derivatives derived through nucleus alkylation, etc.; aliphatic thiols having sulfur atom(s) in addition to mercapto groups, such as bis(mercaptomethyl) sulfide, bis(mercaptoethyl) sulfide, bis(mercaptopropyl) sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithian, bis(mercaptomethyl) disulfide, bis(mercaptoethyl) disulfide, bis(mercaptopropyl) disulfide, etc., and their esters with thioglycolic acid and mercaptopropionic acid, as well as hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethylether bis(2-mercaptoacetate), 2-mercaptoethylether bis(3-mercaptopropionate), 1,4-dithian-2,5-diol bis(2-mercaptoacetate), 1,4-dithian-2,5-diol bis(3-mercaptopropionate), 2-mercaptoethyl thioglycolate, bis(2-mercaptoethyl) thiodipropionate, bis(2-mercaptoethyl) 4,4'-thiodibutyrate, bis(2-mercaptoethyl) dithiodiglycolate, bis(2-mercaptoethyl) dithiodipropionate, bis(2-mercaptoethyl) 4,4'-dithiodibutyrate, bis(2,3-dimercaptopropyl) thiodiglycolate, bis(2,3-dimercaptopropyl) thiodipropionate, bis(2,3-dimercaptopropyl) dithiodiglycolate, bis(2,3-dimercaptopropyl) dithiodipropionate, 4-mercaptomethyl-3,6-dithiaoctane-1,8-dithiol, bis(mercaptomethyl)-3,6,9-trithia-1,11-undecanedithiol, bis(1,3-dimercapto-2-propyl) sulfide, etc.; heterocyclic compounds having sulfur atom(s) in addition to mercapto groups, such as 3,4-thiophenedithiol, tetrahydrothiophene-2,5-dimercaptomethyl, 2,5-dimercapto-1,3,4-thiadiazole, 2,5-dimercapto-1,4-dithian, 2,5-dimercaptomethyl-1,4-dithian, etc. Of these, preferred for use in the invention are isocyanate compounds having sulfur atom(s), and polythiol compounds having sulfur atom(s) in addition to mercapto groups, as providing high-refractivity plastic lenses for spectacles.

The polyol compound includes, for example, aliphatic polyols such as ethylene glycol, diethylene glycol, propylene glycol, dipropylene glycol, butylene glycol, neopentyl glycol, glycerin, trimethylolethane, trimethylolpropane, butanetriol, 1,2-methylglucoside, pentaerythritol, dipentaerythritol, tripentaerythritol, triethylene glycol, polyethylene glycol, tris(2-hydroxyethyl) isocyanurate, cyclobutanediol, cyclopentanediol, cyclohexanediol, cycloheptanediol, cyclooctanediol, bicyclo[4.3.0]-nonanediol, dicyclohexanediol, tricyclo[5.3.1.1]

dodecanediol, spiro[3.4]octanediol, butylcyclohexanediol, etc.; aromatic polyols such as dihydroxynaphthalene, trihydroxynaphthalene, tetrahydroxynaphthalene, dihydroxybenzene, benzenetriol, trihydroxyphenanthrene, bisphenol A, bisphenol F, xylylene glycol, tetrabromobisphenol A, etc., and their adducts with alkylene oxides such as ethylene oxide, propylene oxide, etc.; bis[4-(hydroxyethoxy)phenyl] sulfide, bis-[4-(2-hydroxypropoxy)phenyl] sulfide, bis-[4-(2,3-dihydroxypropoxy)phenyl] sulfide, bis-[4-(4-hydroxycyclohexyloxy)phenyl] sulfide, bis-[2-methyl-4-(hydroxyethoxy)-6-butylphenyl] sulfide, and their adducts with at most 3 molecules on average, per one hydroxyl group, of ethylene oxide and/or propylene oxide; polyols having sulfur atoms(s), such as di-(2-hydroxyethyl) sulfide, 1,2-bis-(2-hydroxyethylmercapto) ethane, bis(2-hydroxyethyl) disulfide, 1,4-dithian-2,5-diol, bis(2,3-dihydroxypropyl) sulfide, tetrakis(4-hydroxy-2-thiabutyl)methane, bis(4-hydroxyphenyl) sulfone (trade name, bisphenol S), tetrabromobisphenol S, tetramethylbisphenol S, 4,4'-thiobis(6-tert-butyl-3-methylphenol), 1,3-bis(2-hydroxyethylthioethyl)-cyclohexane, etc. Of these, preferred for use in the invention are polyol compounds having sulfur atom(s), as providing high-refractivity plastic lenses for spectacles.

(Thio)urethane monomers are known. References concretely disclosing the monomers are, for example, Japanese Patent Laid-Open Nos. 127914/1983, 136601/1982, 163012/1989, 236386/1991, 281312/1991, 159275/1992, 148340/1993, 065193/1994, 256459/1994, 313801/1994, 192250/1994, 063902/1995, 104101/1995, 118263/1995, 118390/1995, 316250/1995, 199016/1985, 217229/1985, 236818/1987, 255901/1987, 267316/1987, 130615/1988, 130614/1988, 046213/1988, 245421/1988, 265201/1988, 090167/1989, 090168/1989, 090169/1989, 090170/1989, 096208/1989, 152019/1989, 045611/1989, 213601/1989, 026622/1989, 054021/1989, 311118/1989, 295201/1989, 302202/1989, 153302/1990, 295202/1989, 802/1990, 036216/1990, 058517/1990, 167330/1990, 270859/1990, 84031/1991, 084021/1991, 124722/1991, 78801/1992, 117353/1992, 117354/1992, 256558/1992, 78441/1993, 273401/1993, 093801/1993, 080201/1993, 297201/1993, 320301/1993, 208950/1993, 072989/1994, 256342/1994, 122748/1994, 165859/1995, 118357/1995, 242722/1995, 247335/1995, 252341/1995, 73732/1996, 092345/1996, 228659/1995, 3267/1996, 252207/1995, 324118/1995, 208651/1997, etc. Needless to say, the polyisocyanate compounds, polyol compounds and polythiol compounds disclosed in these patent publications are all in the category of (thio)urethane monomers for use herein.

Also needless to say, it is possible to add any other plastic lens monomers such as episulfide monomers, diethylene glycol allylcarbonate monomers and others to these (thio)urethane monomers for improving the physical properties such as heat resistance, refractivity and others of the plastic lenses to be produced herein.

Episulfide monomers may be referred to as epithio monomers, indicating monomers having an episulfide group (epithio group) and their mixtures. Specific examples of such episulfide group-having monomers are episulfide compounds having an alicyclic skeleton, such as 1,3- and 1,4-bis(β-epithiopropylthio)cyclohexanes, 1,3-and 1,4-bis(β-epithiopropylthiomethyl)cyclohexanes, bis[4-(β-epithiopropylthio)cyclohexyl]methane, 2,2-bis[4-(β-epithiopropylthio)cyclohexyl]propane, bis[4-(β-epithiopropylthio)cyclohexyl] sulfide, etc.; episulfide compounds having an aromatic skeleton, such as 1,3- and 1,4-bis(β-epithiopropylthio)benzenes, 1,3- and 1,4-bis(β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl] sulfide, bis[4-(β-epithiopropylthio)phenyl]sulfine, 4,4-bis(β-epithiopropylthio)biphenyl, etc.; episulfide compounds having a dithianyl skeleton, such as 2,5-bis(β-epithiopropylthiomethyl)-1,4-dithian, 2,5-bis(β-epithiopropylthioethylthiomethyl)-1,4-dithian, 2,5-bis(β-epithiopropylthioethyl)-1,4-dithian, 2,3,5-tri(β-epithiopropylthioethyl)-1,4-dithian, etc.; episulfide compounds having an aliphatic skeleton, such as 2-(2-β-epithiopropylthioethylthio)-1,3-bis(β-epithiopropylthio) propane, 1,2-bis[(2-β-epithiopropylthioethyl)thio]-3-(β-epithiopropylthio)propane, tetrakis(β-epithiopropylthiomethyl)methane, 1,1,1-tris(β-epithiopropylthiomethyl)propane, bis(β-epithiopropyl) sulfide, etc. Of these, preferred for use in the invention are high-sulfur episulfide compounds, as providing high-refractivity plastic lenses for spectacles.

Episulfide monomers were known. References concretely disclosing the monomers are, for example, Japanese Patent Laid-Open Nos. 071580/1997, 110979/1997, 255781/1997, 081320/1991, 140070/1999, 183702/1999, 189592/1999, 180977/1999, Japanese Patent Re-Laid-Open No. 810575/1989, etc. Needless to say, the monomers disclosed in these patent publications are all in the category of episulfide monomers for use herein. Also needless to say, it is possible to add any other plastic lens monomers, for example, (thio)urethane monomers such as those mentioned above and others to these episulfide monomers for improving the physical properties such as impact resistance, workability and others of the plastic lenses to be produced herein.

Diethylene glycol bisallylcarbonate monomers include diethylene glycol bisallylcarbonate alone, and its mixtures with other monomers copolymerizable with diethylene glycol bisallylcarbonate. Specific examples of such comonomers are aromatic vinyl compounds such as styrene, α-methylstyrene, vinyltoluene, chlorostyrene, chloromethylstyrene, divinylbenzene, etc.; mono(meth) acrylates such as methyl (meth)acrylate, n-butyl (meth) acrylate, n-hexyl (meth)acrylate, cyclohexyl (meth)acrylate, 2-ethylhexyl (meth)acrylate, methoxydiethylene glycol (meth)acrylate, methoxypolyethylene glycol (meth)acrylate, 3-chloro-2-hydroxypropyl (meth)acrylate, stearyl (meth) acrylate, lauryl (meth)acrylate, phenyl (meth)acrylate, glycidyl (meth)acrylate, benzyl methacrylate, etc.; mono(meth) acrylates having hydroxyl group(s), such as 2-hydroxyethyl (meth)acrylate, 2-hydroxypropyl (meth)acrylate, 3-hydroxypropyl (meth)acrylate, 3-phenoxy-2-hydroxypropyl (meth)acrylate, 4-hydroxybutyl (meth) acrylate, etc.; di(meth)acrylates such as ethylene glycol di(meth)acrylate, diethylene glycol di(meth)acrylate, triethylene glycol di(meth)acrylate, polyethylene glycol di(meth) acrylate, 1,3-butylene glycol di(meth)acrylate, 1,6-hexanediol di(meth)acrylate, neopentyl glycol di(meth) acrylate, polypropylene glycol di(meth)acrylate, 2-hydroxy-1,3-di(meth)acryloxypropane, 2,2-bis[4-((meth) acryloxyethoxy)phenyl]propane, 2,2-bis[4-((meth) acryloxy-diethoxy)phenyl]propane, 2,2-bis[4-((meth) acryloxy-polyethoxy)phenyl]propane, etc.; tri(meth) acrylates such as trimethylolpropane trimethacrylate, tetramethylolmethane trimethacrylate, etc.; tetra(meth) acrylates such as tetramethylolmethane tetra(meth)acrylate, etc.; diallyl phthalate, diallyl isophthalate, diallyl terephthalate, etc. (Meth)acrylate referred to herein is meant to indicate methacrylate or acrylate. Of these, preferred for use herein are aromatic monomers, as providing high-refractivity plastic lenses for spectacles.

Copolymers of diethylene glycol bisallylcarbonate and other monomers were known. Their examples are disclosed in Japanese Patent Laid-Open Nos. 41965/1979, 125487/1976, Japanese Patent Re-Laid-Open No. 503809/1989, etc. Needless to say, the mixtures of diethylene glycol bisallylcarbonate and monomers copolymerizable with it disclosed in these patent publications are all in the category of diethylene glycol bisallylcarbonate monomers for using herein.

The plastic lenses for spectacles of the invention may be of different types, and will be suitably selected depending on their applications. For example, those of the following Types (1) to (3) are preferred embodiments of the invention.

Type (1): A diethylene glycol bisallylcarbonate polymer-type plastic lens for spectacles, which contains 2-(2-hydroxy-4-octyloxyphenyl)-benzotriazole, and of which the center, when having a thickness of 2.2 mm, has an yellow index (YI) falling between 0.7 and 1.6 and a 380 nm UV transmittance of at most 30%;

Type (2): A polythiourethane-type plastic lens for spectacles, which contains 2-(2-hydroxy-4-octyloxyphenyl)-benzotriazole, and of which the center, when having a thickness of 1.6 mm, has an yellow index (YI) falling between 0.7 and 1.5 and a 400 nm UV transmittance of at most 35%;

Type (3): An episulfide polymer-type plastic lens for spectacles, which contains 2-(2-hydroxy-4-octyloxyphenyl)-benzotriazole, and of which the center, when having a thickness of 1.8 mm, has an yellow index (YI) falling between 0.7 and 1.8 and a 400 nm UV transmittance of at most 30%.

The plastic lenses for spectacles of the invention are obtained by polymerizing a plastic lens monomer mixed with a UV absorbent, 2-(2-hydroxy-4-octyloxyphenyl)-benzotriazole added thereto. The method of polymerizing the plastic lens monomer is not specifically defined, for which, however, generally employed is cast polymerization. Specifically, a plastic lens monomer such as that mentioned above is mixed with 2-(2-hydroxy-4-octyloxyphenyl)-benzotriazole, and the resulting mixture is cast into a mold for lenses, and heated therein at a temperature falling between −20° C. and 150° C. to give the intended plastic lenses for spectacles. To the mixture of 2-(2-hydroxy-4-octyloxyphenyl)-benzotriazole and a plastic lens monomer, if desired, optionally added are a polymerization catalyst such as that described in Japanese Patent laid-Open Nos. 063902/1995, 104101/1995, 208621/1997, 255781/1997, etc.; and an internal lubricant, an antioxidant and any other auxiliary agents such as those described in Japanese Patent Laid-Open Nos. 163012/1989, 281312/1991, etc.

Also if desired, the plastic lenses for spectacles of the invention may be optionally colored with a colorant. For improving their scratch resistance, the plastic lenses may be coated with a hard film, for which is usable a coating liquid that contains an organosilicon compound or inorganic fine particles of tin oxide, silicon oxide, zirconium oxide, titanium oxide, etc. For improving their impact resistance, the plastic lenses may be coated with a primer layer that consists essentially of polyurethane. For preventing them from glaring, the plastic lenses may be coated with an anti-glare film that contains silicon oxide, titanium dioxide, zirconium oxide, tantalum oxide, etc. For improving their water repellency, the anti-glare film of the plastic lenses may be coated with a water-repellent film of fluorine atom-containing organosilicon compound.

EXAMPLES

The invention is described concretely with reference to the following Examples, which, however, are not intended to restrict the scope of the invention. The physical properties of the plastic lenses produced herein are measured according to the methods mentioned below.

1. Yellowness Index (YI):

This is measured according to JIS K7103-1977 that indicates the yellow index of plastics and test methods for determining the yellow index of plastics.

2. Transmittance:

The 380 nm or 400 nm UV transmittance of each plastic lens is measured, using a spectrophotometer, Hitachi's U3410.

Example 1

To 100 parts by weight of diethylene glycol bisallylcarbonate, added were 0.10 parts by weight of 2-(2-hydroxy-4-octyloxyphenyl)-benzotriazole serving as a UV absorbent, and 3 parts by weight of diisopropyl peroxydicarbonate serving as a polymerization catalyst, and these were well stirred and mixed to prepare a monomer composition for lenses.

Next, the monomer composition was cast into a glass mold for lenses (lens power: 0.00D, lens diameter 70 mm, lens thickness 2.2 mm), which had been previously prepared and equipped with a resin gasket. The mold was put into an electric furnace, and gradually heated therein from 40° C. up to 85° C. over a period of 20 hours and then kept heated at 85° C. for 1 hour, through which the monomer was polymerized.

After the polymerization, the gasket and the mold were released, and the lens formed was further heated at 120° C. for 1 hour.

The center (having a thickness of 2.2 mm) of the lens thus obtained had YI of 1.6. The lens was slightly yellowish, but its 380 nm UV transmittance was 1% and its UV-cutting capability was good. The spectral curve through the lens is shown in FIG. 1.

Example 2

A lens was produced in the same manner as in Example 1, to which, however, the amount of the UV absorbent added was 0.05 parts by weight.

The center (having a thickness of 2.2 mm) of the lens thus obtained had YI of 1.4. The lens was slightly yellowish, but its 380 nm UV transmittance was 9% and its UV-cutting capability was good. The spectral curve through the lens is shown in FIG. 1.

Example 3

A lens was produced in the same manner as in Example 1, to which, however, the amount of the UV absorbent added was 0.025 parts by weight.

The center (having a thickness of 2.2 mm) of the lens thus obtained had YI of 1.0. The lens was slightly yellowish, but its 380 nm UV transmittance was 27% and its UV-cutting capability was good. The spectral curve through the lens is shown in FIG. 1.

Comparative Example 1

A lens was produced in the same manner as in Example 1, to which, however, added was 0.50 parts by weight of 4-dodecyloxy-2-hydroxybenzophenone serving as a UV absorbent.

Figure 2:
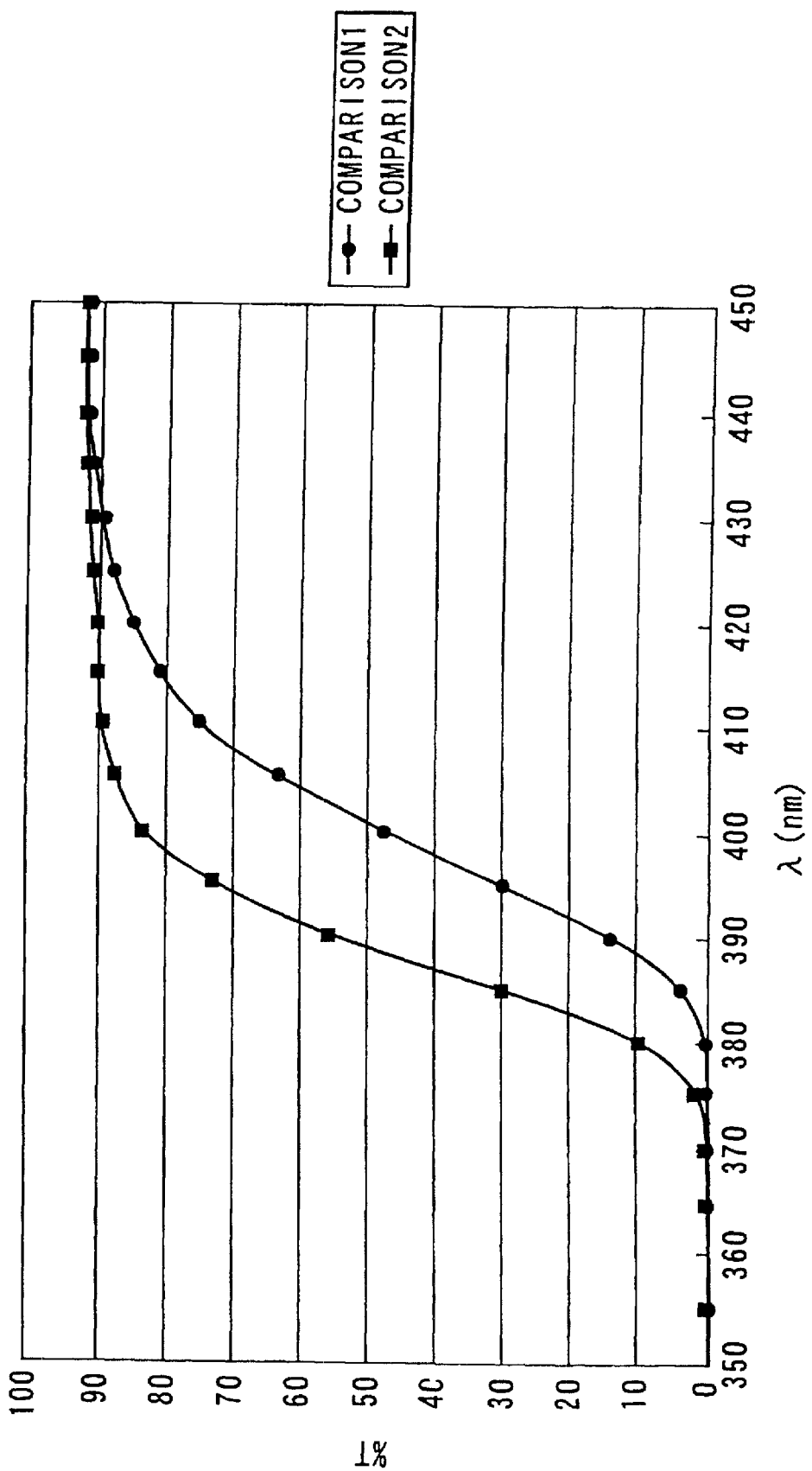
FIG. 2 is a graph showing the spectral curves through the lenses of Comparative Examples 1 and 2.

The center (having a thickness of 2.2 mm) of the lens thus obtained had YI of 2.1, and the 380 nm UV transmittance thereof was 1%. Though its UV-cutting capability was good, the lens was yellowish. The spectral curve through the lens is shown in FIG. 2.

Comparative Example 2

A lens was produced in the same manner as in Example 1, to which, however, added was 0.10 parts by weight of 2-(2-hydroxy-5-tert-octylphenyl) benzotriazole serving as a UV absorbent.

The center (having a thickness of 2.2 mm) of the lens thus obtained had YI of 1.6, and the 380 nm UV transmittance thereof was 10%. Though its UV-cutting capability was good, the lens was yellowish. The spectral curve through the lens is shown in FIG. 2.

The data as above are summarized in Table 1.

Example 6

0.05 parts by weight of dibutyltin dilaurate and 1.00 part by weight of 2-(2-hydroxy-4-octyloxyphenyl)-benzotriazole serving as a UV absorbent were added to and mixed with 43.5 parts by weight of 1,3-diisocyanatomethylbenzene with stirring, to which was added 56.5 parts by weight of pentaerythritol tetrakismercaptopropionate, and further stirred under a reduced pressure of 10 mmHg for 30 minutes to prepare a monomer composition for lenses.

Next, the monomer composition was cast into a glass mold for lenses (lens power: 0.00D, lens diameter 80 mm, lens thickness 1.6 mm), which had been previously prepared

TABLE 1

| | Starting Monomer (wt. pts.) | UV Absorbent (wt. pts.) | YI | Center Thickness (mm) | Transmittance (%) 380 nm | 400 nm |
|---|---|---|---|---|---|---|
| Example 1 | diethylene glycol bisallylcarbonate (100) | 2-(2-hydroxy-4-octyloxyphenyl)-benzotriazole (0.10) | 1.6 | 2.2 | 1 | — |
| Example 2 | diethylene glycol bisallylcarbonate (100) | 2-(2-hydroxy-4-octyloxyphenyl)-benzotriazole (0.05) | 1.4 | 2.2 | 9 | — |
| Example 3 | diethylene glycol bisallylcarbonate (100) | 2-(2-hydroxy-4-octyloxyphenyl)-benzotriazole (0.025) | 1.0 | 2.2 | 27 | — |
| Comp. Ex. 1 | diethylene glycol bisallylcarbonate (100) | 4-dodecyloxy-2-hydroxy-benzophenone (0.50) | 2.1 | 2.2 | 1 | — |
| Comp. Ex. 2 | diethylene glycol bisallylcarbonate (100) | 2-(2-hydroxy-5-tert-octylphenyl)-benzotriazole (0.10) | 1.6 | 2.2 | 10 | — |

Example 4

1.00 part by weight of 2-(2-hydroxy-4-octyloxyphenyl)-benzotriazole serving as a UV absorbent was added to and mixed with 47.5 parts by weight of 1,3-diisocyanatomethylcyclohexane and 0.45 parts by weight of dimethyltin dichloride with stirring, to which were added 26.0 parts by weight of 2,5-dimercaptomethyl-1,4-dithian and 26.5 parts by weight of pentaerythritol tetrakismercaptoacetate, and further stirred under a reduced pressure of 10 mmHg for 30 minutes to prepare a monomer composition for lenses.

Next, the monomer composition was cast into a glass mold for lenses (lens power: 0.00D, lens diameter 80 mm, lens thickness 1.6 mm), which had been previously prepared and equipped with a resin gasket. The mold was put into an electric furnace, and gradually heated therein from 20° C. up to 100° C. over a period of 20 hours. After having been thus heated, this was once taken out of the furnace, and its gasket was removed. Then, it was again put into the furnace, heated therein up to 120° C. over a period of 1 hour, and then kept heated at 120° C. for 3 hours. Through the process, the monomers were polymerized.

After the polymerization, the mold was released, and the lens formed was further heated at 120° C. for 1 hour.

Figure 3:
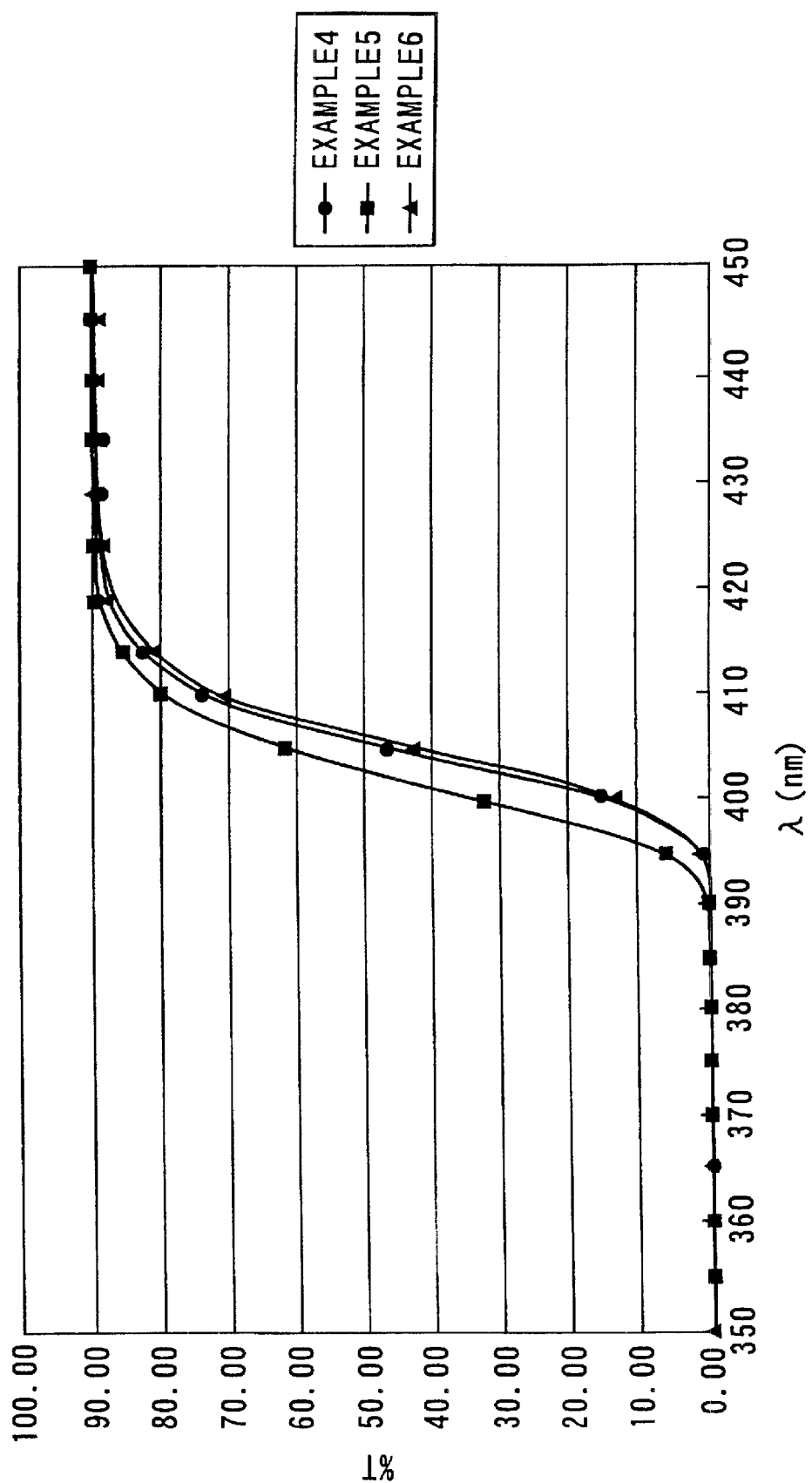
FIG. 3 is a graph showing the spectral curves through the lenses of Examples 4 to 6.

The center (having a thickness of 1.6 mm) of the lens thus obtained had YI of 1.3. The lens was slightly yellowish, but its 400 nm UV transmittance was 14% and its UV-cutting capability was good. The spectral curve through the lens is shown in FIG. 3.

Example 5

A lens was produced in the same manner as in Example 4, to which, however, the amount of the UV absorbent added was 0.50 parts by weight.

The center (having a thickness of 1.6 mm) of the lens thus obtained had YI of 1.0. The lens was slightly yellowish, but its 400 nm UV transmittance was 33% and its UV-cutting capability was good. The spectral curve through the lens is shown in FIG. 3.

Example 6 (continued)

and equipped with a resin gasket. The mold was put into an electric furnace, and gradually heated therein from 20° C. up to 100° C. over a period of 20 hours. After having been thus heated, this was once taken out of the furnace, and its gasket was removed. Then, it was again put into the furnace, heated therein up to 120° C. over a period of 1 hour, and then kept heated at 120° C. for 3 hours. Through the process, the monomers were polymerized.

After the polymerization, the mold was released, and the lens formed was further heated at 120° C. for 1 hour.

The center (having a thickness of 1.6 mm) of the lens thus obtained had YI of 1.5. The lens was slightly yellowish, but its 400 nm UV transmittance was 12% and its UV-cutting capability was good. The spectral curve through the lens is shown in FIG. 3.

Comparative Example 3

A lens was produced in the same manner as in Example 4, to which, however, added was 2.00 parts by weight of 4-dodecyloxy-2-hydroxybenzophenone serving as a UV absorbent.

Figure 4:
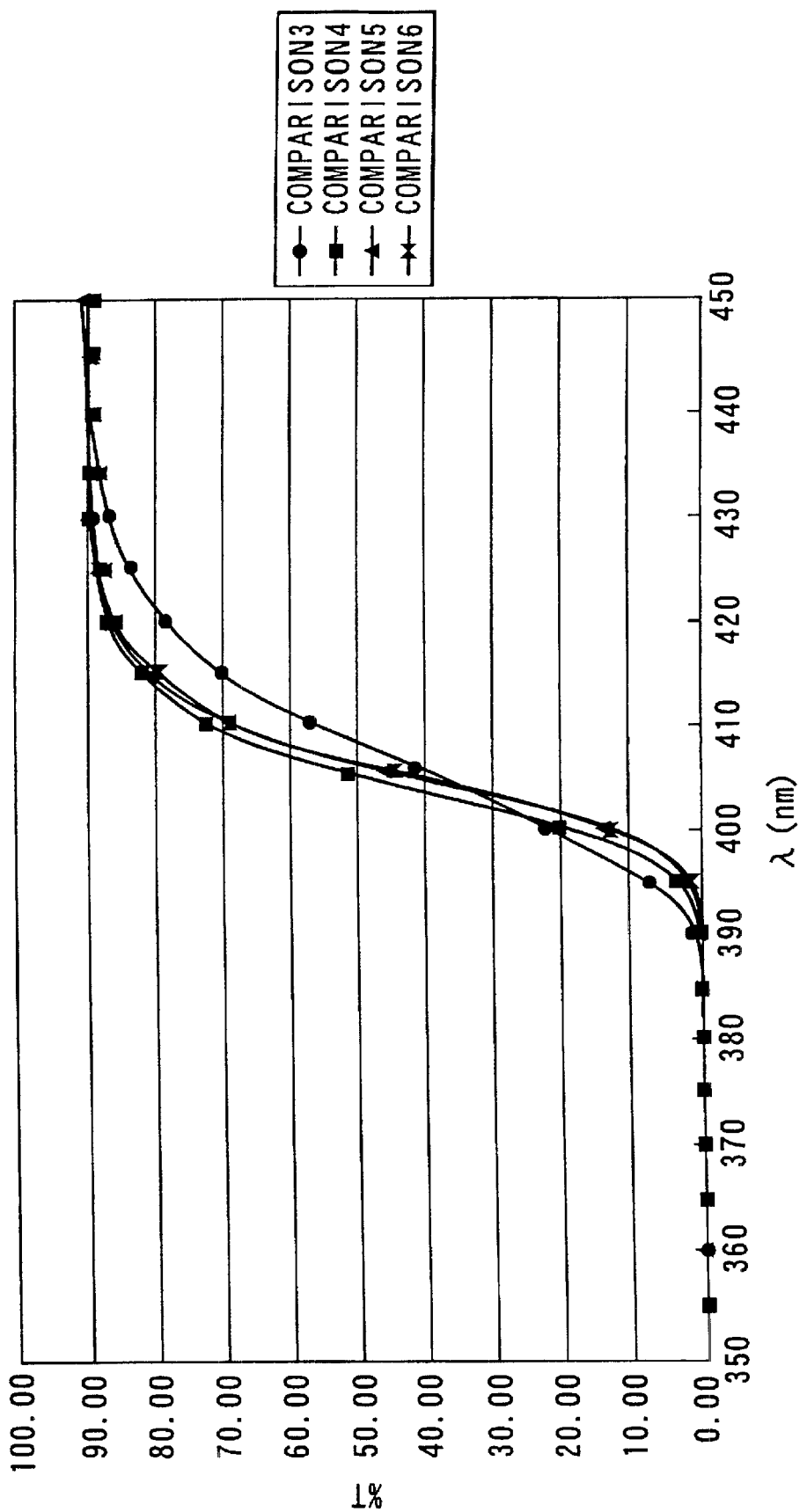
FIG. 4 is a graph showing the spectral curves through the lenses of Comparative Examples 3 to 6.

The center (having a thickness of 1.6 mm) of the lens thus obtained had YI of 3.9, and the 400 nm UV transmittance thereof was 24%. Though its UV-cutting capability was good, the lens was yellowish. The spectral curve through the lens is shown in FIG. 4.

Comparative Example 4

A lens was produced in the same manner as in Example 4, to which, however, added was 1.00 part by weight of 2-(2-hydroxy-5-methylphenyl)-benzotriazole serving as a UV absorbent.

The center (having a thickness of 1.6 mm) of the lens thus obtained had YI of 1.4, and the 400 nm UV transmittance thereof was 22%. Though its UV-cutting capability was good, the lens was yellowish. The spectral curve through the lens is shown in FIG. 4.

Comparative Example 5

A lens was produced in the same manner as in Example 4, to which, however, added was 1.00 part by weight of 2-(2-hydroxy-5-tert-octylphenyl)-benzotriazole serving as a UV absorbent.

The center (having a thickness of 1.6 mm) of the lens thus obtained had YI of 1.5, and the 400 nm UV transmittance thereof was 17%. Though its UV-cutting capability was good, the lens was yellowish. The spectral curve through the lens is shown in FIG. 4.

Comparative Example 6

A lens was produced in the same manner as in Example 6, to which, however, added was 1.00 part by weight of 2-(2-hydroxy-5-methylphenyl)-benzotriazole serving as a UV absorbent.

The center (having a thickness of 1.6 mm) of the lens thus obtained had YI of 1.6, and the 400 nm UV transmittance thereof was 17%. Though its UV-cutting capability was good, the lens was yellowish. The spectral curve through the lens is shown in FIG. 4.

The data as above are summarized in Table 2.

Next, the monomer composition was cast into a glass mold for lenses (lens power: 0.00D, lens diameter 80 mm, lens thickness 1.8 mm), which had been previously prepared and equipped with a resin gasket. The mold was put into an electric furnace, and gradually heated therein from 20° C. up to 100° C. over a period of 20 hours and then kept heated at 100° C. for 30 minutes, through which the monomers were polymerized.

After the polymerization, the mold was released, and the lens formed was further heated at 110° C. for 1 hour.

Figure 5:
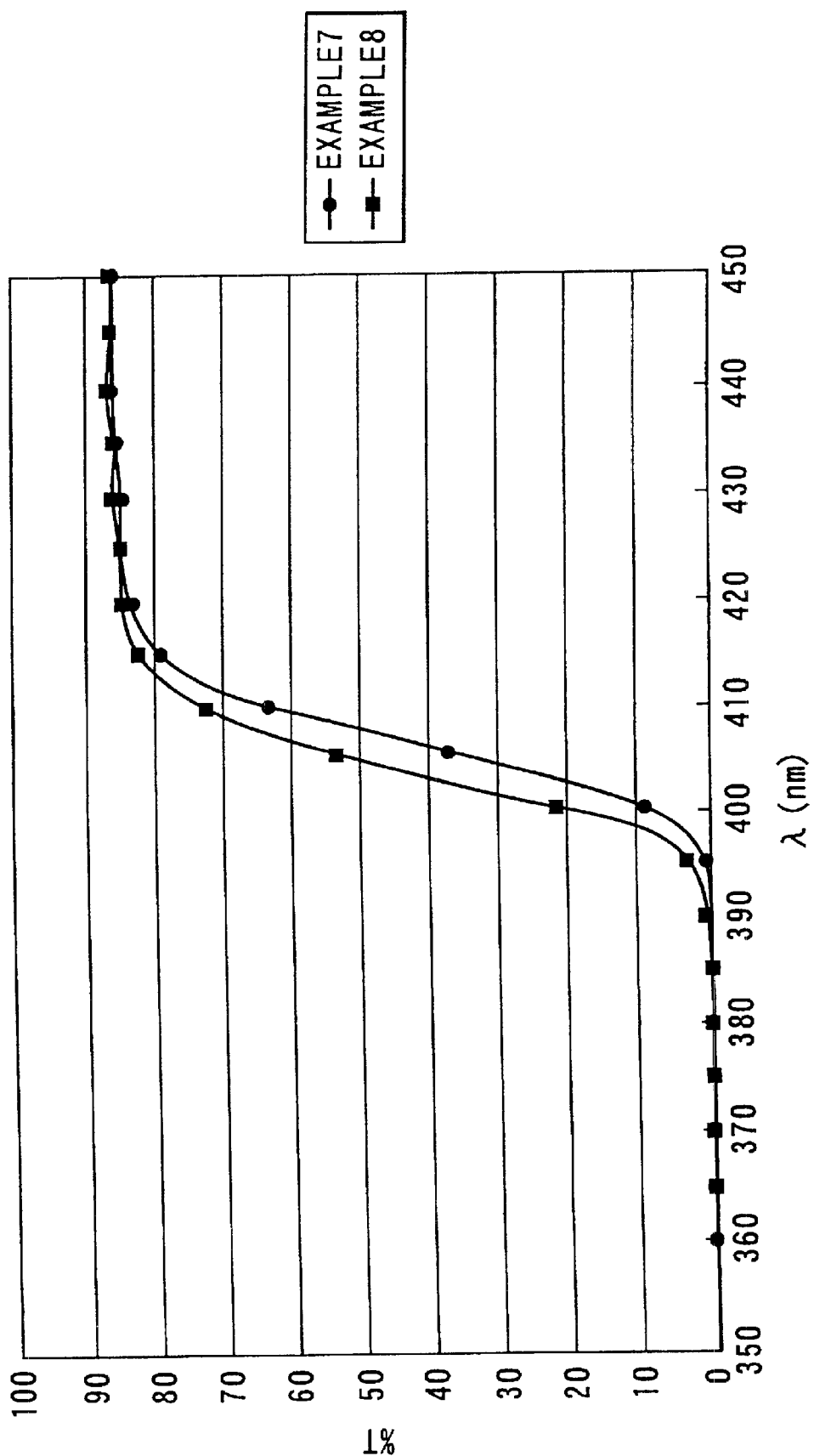
FIG. 5 is a graph showing the spectral curves through the lenses of Examples 7 and 8.

The center (having a thickness of 1.8 mm) of the lens thus obtained had YI of 1.8. The lens was slightly yellowish, but its 400 nm UV transmittance was 10% and its UV-cutting capability was good. The spectral curve through the lens is shown in FIG. 5.

Example 8

A lens was produced in the same manner as in Example 7, to which, however, the amount of the UV absorbent added was 0.25 parts by weight.

TABLE 2

| | Starting Monomer (wt. pts.) | UV Absorbent (wt. pts.) | YI | Center Thickness (mm) | Transmittance (%) 380 nm | Transmittance (%) 400 nm |
|---|---|---|---|---|---|---|
| Example 4 | 1,3-diisocyanatomethyl-cyclohexane (47.5) 2,5-dimercaptomethyl-1,4-dithian (26.0) pentaerythritol tetrakismercaptoacetate (26.5) | 2-(2-hydroxy-4-octyloxyphenyl)-benzotriazole (1.00) | 1.3 | 1.6 | — | 14 |
| Example 5 | 1,3-diisocyanatomethyl-cyclohexane (47.5) 2,5-dimercaptomethyl-1,4-dithian (26.0) pentaerythritol tetrakismercaptoacetate (26.5) | 2-(2-hydroxy-4-octyloxyphenyl)-benzotriazole (0.50) | 1.0 | 1.6 | — | 33 |
| Example 6 | 1,3-diisocyanatomethyl-benzene (43.5) pentaerythritol tetrakis-mercaptopropionate (56.5) | 2-(2-hydroxy-4-octyloxyphenyl)-benzotriazole (1.00) | 1.5 | 1.6 | — | 12 |
| Comp. Ex. 3 | 1,3-diisocyanatomethyl-cyclohexane (47.5) 2,5-dimercaptomethyl-1,4-dithian (26.0) pentaerythritol tetrakismercaptoacetate (26.5) | 4-dodecyloxy-2-hydroxybenzophenone (2.00) | 3.9 | 1.6 | — | 24 |
| Comp. Ex. 4 | 1,3-diisocyanatomethyl-cyclohexane (47.5) 2,5-dimercaptomethyl-1,4-dithian (26.0) pentaerythritol tetrakismercaptoacetate (26.5) | 2-(2-hydroxy-5-methylphenyl)-benzotriazole (1.00) | 1.4 | 1.6 | — | 22 |
| Comp. Ex. 5 | 1,3-diisocyanatomethyl-cyclohexane (47.5) 2,5-dimercaptomethyl-1,4-dithian (26.0) pentaerythritol tetrakismercaptoacetate (26.5) | 2-(2-hydroxy-5-tert-octylphenyl)-benzotriazole (1.00) | 1.5 | 1.6 | — | 17 |
| Comp. Ex. 6 | 1,3-diisocyanatomethyl-benzene (43.5) pentaerythritol tetrakis-mercaptopropionate (56.5) | 2-(2-hydroxy-5-methylphenyl)-benzotriazole (1.00) | 1.6 | 1.6 | — | 17 |

Example 7

93.0 parts by weight of bis-(β-epithiopropyl) sulfide, 1.0 part by weight of 2-hydroxyethyl methacrylate, and 0.50 parts by weight of 2-(2-hydroxy-4-octyloxyphenyl)-benzotriazole serving as a UV absorbent were mixed with stirring, to which were added 6.0 parts by weight of n-butyl thioglycolate, and 0.25 parts by weight of N,N-diethanolamine serving as a catalyst, and further stirred under a reduced pressure of 10 mHg for 3 hours to prepare a monomer composition for lenses.

The center (having a thickness of 1.8 mm) of the lens thus obtained had YI of 1.5. The lens was slightly yellowish, but its 400 nm UV transmittance was 24% and its UV-cutting capability was good. The spectral curve through the lens is shown in FIG. 5.

Comparative Example 7

A lens was produced in the same manner as in Example 7, to which, however, added was 2.00 parts by weight of 4-dodecyloxy-2-hydroxybenzophenone serving as a UV absorbent.

The lens thus obtained had YI of 4.1, and its 400 nm UV transmittance was 24%. Though its UV-cutting capability was good, the lens was yellowish. The spectral curve through the lens is shown in FIG. 6.

Comparative Example 8

A lens was produced in the same manner as in Example 7, to which, however, added was 1.00 part by weight of 2-(2-hydroxy-5-tert-octylphenyl) benzotriazole serving as a UV absorbent.

The center (having a thickness of 1.8 mm) of the lens thus obtained had YI of 2.3, and the 400 nm UV transmittance thereof was 7%. Though its UV-cutting capability was good, the lens was yellowish. The spectral curve through the lens is shown in FIG. 6.

Comparative Example 9

A lens was produced in the same manner as in Example 7, to which, however, added was 0.05 parts by weight of 2,2'-dihydroxy-4-methoxybenzophenone serving as a UV absorbent.

The center (having a thickness of 1.8 mm) of the lens thus obtained had YI of 6.6, and the 400 nm UV transmittance thereof was 7%. Though its UV-cutting capability was good, the lens was yellowish. The spectral curve through the lens is shown in FIG. 6.

The data as above are summarized in Table 3.

polymerizing a diethylene glycol bisallylcarbonate monomer.

4. The optical lens of claim 3, wherein said optical lens absorbs long-wave UV rays having a wavelength of around 400 nm.

5. The optical lens according to claim 3,
wherein the optical lens has a yellowness index (YI) between about 0.7 and 1.6 and a 380 nm UV transmittance of at most 30% measured when a thickness of the optical lens is about 2.2.

6. Spectacles comprising the optical lens according to claim 3 or 5.

7. A method for producing an optical lens comprising,
adding 2-(2-hydroxy-4-octyloxyphenyl)-benzotriazole to an episulfide monomer to form a mixture, and
polymerizing the monomer in the mixture to form the optical lens,
wherein the optical lens has a yellowness index (YI) between about 0.7 and 1.8 and a 400 nm UV transmittance of at most 30% measured when a thickness of the optical lens is about 1.8 mm.

8. The method of claim 7, further comprising casting the mixture into a mold for a lens before the polymerizing of the monomer to form the optical lens.

9. An optical lens comprising 2-(2-hydroxy-4-octyloxyphenyl)-benzotriazole and a polymer formed by polymerizing an episulfide monomer,
wherein the optical lens has a yellowness index (YI) between about 0.7 and 1.8 and a 400 nm UV transmit-

TABLE 3

| | Starting Monomer (wt. pts.) | UV Absorbent (wt. pts.) | YI | Center Thickness (mm) | Transmittance (%) 380 nm | 400 nm |
|---|---|---|---|---|---|---|
| Example 7 | bis(β-epithiopropyl) sulfide (93.0) 2-hydroxyethyl methacrylate (1.0) n-butyl thioglycolate (6.0) | 2-(2-hydroxy-4-octyloxyphenyl)-benzotriazole (0.50) | 1.8 | 1.8 | — | 10 |
| Example 8 | bis(β-epithiopropyl) sulfide (93.0) 2-hydroxyethyl methacrylate (1.0) n-butyl thioglycolate (6.0) | 2-(2-hydroxy-4-octyloxyphenyl)-benzotriazole (0.25) | 1.5 | 1.8 | — | 24 |
| Comp. Ex. 7 | bis(β-epithiopropyl) sulfide (93.0) 2-hydroxyethyl methacrylate (1.0) n-butyl thioglycolate (6.0) | 4-dodecyloxy-2-hydroxybenzophenone (2.00) | 4.1 | 1.8 | — | 24 |
| Comp. Ex. 8 | bis(β-epithiopropyl) sulfide (93.0) 2-hydroxyethyl methacrylate (1.0) n-butyl thioglycolate (6.0) | 2-(2-hydroxy-5-tert-octylphenyl)-benzophenone (1.00) | 2.3 | 1.8 | — | 7 |
| Comp. Ex. 9 | bis(β-epithiopropyl) sulfide (93.0) 2-hydroxyethyl methacrylate (1.0) n-butyl thioglycolate (6.0) | 2,2'-dihydroxy-4-methoxybenzophenone (0.05) | 6.6 | 1.8 | — | 7 |

What is claimed is:

1. A method for producing an optical lens comprising,
adding 2-(2-hydroxy-4-octyloxyphenyl)-benzotriazole to a diethylene glycol bisallylcarbonate monomer to form a mixture, and
polymerizing the monomer in the mixture to form the optical lens,
wherein the optical lens has a yellowness index (YI) between about 0.7 and 1.6 and a 380 mn UV transmittance of at most 30% measured when a thickness of the optical lens is about 2.2 mm.

2. The method of claim 1, further comprising casting the mixture into a mold for a lens before the polymerizing of the monomer to form the optical lens.

3. An optical lens comprising 2-(2-hydroxy-4-octyloxyphenyl)-benzotriazole and a polymer formed by tance of at most 30% measured when a thickness of the optical lens is about 1.8 mm.

10. Spectacles comprising the optical lens according to claim 9.

11. A method for producing an optical lens comprising,
adding 2-(2-hydroxy-4-octyloxyphenyl)-benzotriazole to an thiourethane monomer to form a mixture, and
polymerizing the monomer in the mixture to form the optical lens,
wherein the optical lens has a yellowness index (YI) between about 0.7 and 1.5 and a 400 nm UV transmittance of at most 35% measured when a thickness of the optical lens is about 1.6 mm.

12. The method of claim 11, further comprising casting the mixture into a mold for a lens before the polymerizing of the monomer to form the optical lens.

13. An optical lens comprising 2-(2-hydroxy-4-octyloxyphenyl)-benzotriazole and a polymer formed by polymerizing a thiourethane monomer.

14. The optical lens of claim 13, wherein the optical lens has a yellowness index (YI) between about 0.7 and 1.5 and a 400 nm UV transmittance of at most 35% measured when a thickness of the optical lens is about 1.6 mm.

15. Spectacles comprising the optical lens according to claim 13 or 14.

* * * * *

UNITED STATES PATENT AND TRADEMARK OFFICE
CERTIFICATE OF CORRECTION

PATENT NO. : 6,673,888 B2
DATED : January 6, 2004
INVENTOR(S) : Masahisa Kosaka

It is certified that error appears in the above-identified patent and that said Letters Patent is hereby corrected as shown below:

<u>Column 15,</u>
Line 59, change "mn" to -- nm --.

Signed and Sealed this

Twenty-second Day of February, 2005

JON W. DUDAS
*Director of the United States Patent and Trademark Office*